Aug. 15, 1961    H. A. BAKKE ET AL    2,995,995
OSCILLOGRAPHIC RECORDER

Filed Sept. 14, 1956    3 Sheets-Sheet 1

Inventors:
Hans A. Bakke
Joseph L. Paine
by Richard E. Horley
Their Attorney

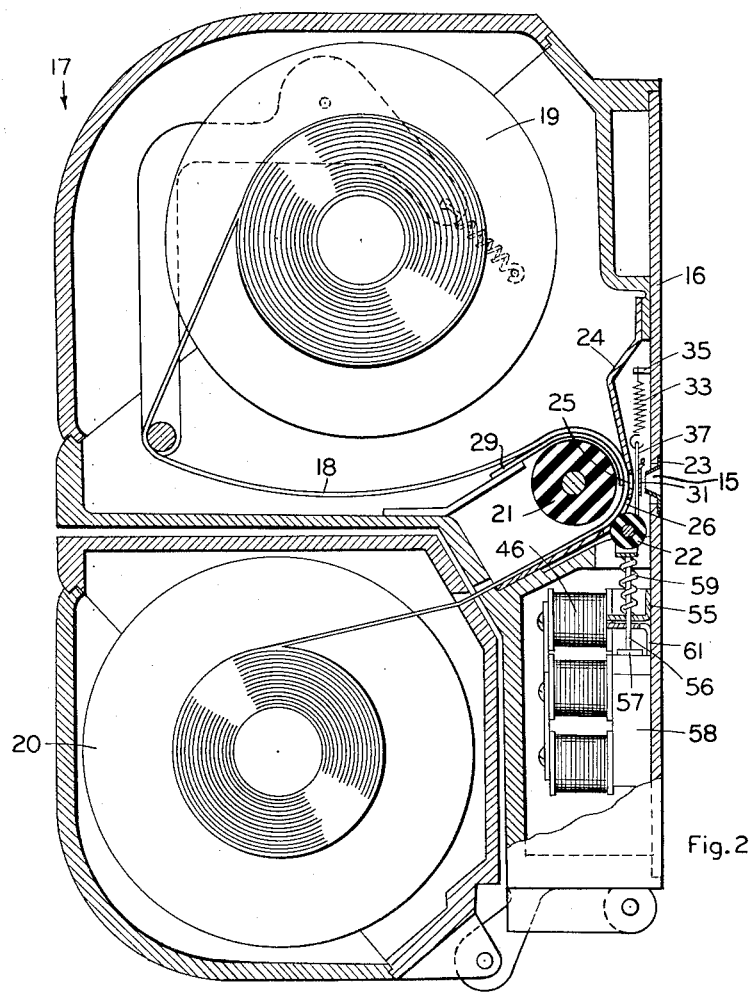
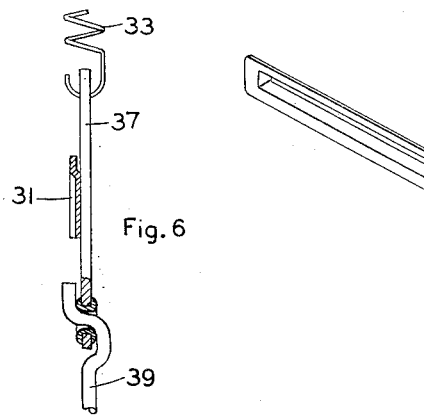
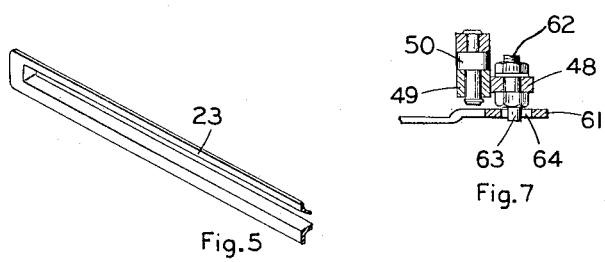
Inventors:
Hans A. Bakke
Joseph L. Paine
by Richard E. Horley
Their Attorney Aug. 15, 1961   H. A. BAKKE ET AL   2,995,995
OSCILLOGRAPHIC RECORDER Filed Sept. 14, 1956   3 Sheets-Sheet 3

Inventors:
Hans A. Bakke
Joseph L. Paine
by Richard E. Hosley
Their Attorney

United States Patent Office 2,995,995
Patented Aug. 15, 1961

2,995,995
OSCILLOGRAPHIC RECORDER
Hans A. Bakke, Swampscott, and Joseph L. Paine, Marblehead, Mass., assignors to General Electric Company, a corporation of New York
Filed Sept. 14, 1956, Ser. No. 610,024
4 Claims. (Cl. 95—55)

Our invention relates to oscillographic recorders and particularly to automatic oscillographic recorders.

In an automatic oscillographic recorder, a photosensitive recording strip is accelerated from standstill to a predetermined rate of travel past a recording point in response to a condition to be recorded. The characteristics of the condition are translated into variations in the amplitude of a beam of light projected to the recording point past which the strip moves. To decrease the response time for recording, a continuously radiating light source is provided for forming the projected beam. It is the practice in commercial embodiments of this type of recorder to house the light source in the same housing structure with the recording strip.

Under such conditions, a light shield and shutter mechanism is required which can prevent light from penetrating into the region where the strip is stored in preparation for future recordings. In oscillographic recorders where a shutter mechanism is required for closing an aperture elongated to as much as ten inches, the problem of providing shutter elements which are precision made to be light tight is considerable and can be overcome only at considerable cost, care in manufacture and assembly, and often with the sacrifice of the quick action demanded by a quick starting recorder apparatus.

It is an object of this invention to provide an improved oscillographic recorder apparatus having an improved shutter mechanism arranged with cooperating structure to prevent light from penetrating past the shutter mechanism to desensitize a photo sensitive strip.

It is a further object of this invention to achieve the aforementioned object without precision parts and without sacrificing shutter speed.

In accordance with the aforementioned objects, this invention is practiced by providing an oscillographic recorder having an optical system including a continuously radiating light source and a recording system having a photo sensitive recording strip. Means is provided for obstructing passage of light from the light source to the strip including a pair of spaced apart plate members having apertures therethrough in substantial alignment and being arranged to cooperate with a shutter mechanism to prevent light rays from passing directly through said apertures to said strip. When a housing is provided to enclose the optical and recording systems thus making the desensitizing problem more acute, the plate members are mounted therein at a location between the light source and strip. In a preferred form, the optical system is contained in a housing to which is removably mounted an enclosure or casing for the recording system. Shielding is preferably effectuated by placing the light obstructing plate members so as to close off the end of the recording system enclosure thus isolating the strip from the light source. With this arrangement, the only possible way for light to penetrate the region of the photo sensitive is through the apertures in the plate members which offer passage, by being in substantial alignment, to a projected light beam from the optical system. To complete the obstruction to light from the optical system. To complete the obstruction to light from said source, a shutter is provided which is translatorily movable between the plate members in the chamber formed by their separation. The shutter is generally elongated and broadly obstructs passage of light by being of width and length greater than the apertures. Thus, incident light is required to pass around the edges of the shutter but this causes light to reflect along trajectories diverging from the aperture of the plate member closest to the strip. Fast action of movement is retained within the design of a shutter mechanism by maintaining the shutter plate out of frictional engagement with either plate member. Thus it may be said that the shutter is floating. Preferably the means for supporting the shutter in a floating manner is attached to the plate member nearest the light source and which in the preferred arrangement acts to form the outer side of the demountable recorder system enclosure.

More specifically, the obstructing properties of the plate and shutter arrangement can be increased by providing a light directing channel member having an aperture therethrough. The channel member is adapted to fit in the plate member nearest the light source and extends inwardly therefrom toward the second plate member. Thus the aperture in the channel member and the second plate member are in alignment. A shutter member preferably shaped to have a flange member is floatingly supported between the end of the channel member with the flange member extending generally along one side of the channel member. Thus the light is required to undergo additional bending or multiple reflections to pass around the shutter. In a further adaptation the shutter may be placed within an enclosure formed between the light obstructing plate members and the light directing channel members. The shutter member is floatingly positioned within the enclosure out of engagement with all other parts. The enclosure is preferably formed with Z-shaped strips extending entirely across the space between the light obstructing plates and along the entire length of the apertures therein. Light penetration is further prevented by providing felt strips in the enclosure formed by the Z-shaped strips and the sides of the channel member against which one edge and the flange of the shutter may be brought to bear in closed position.

The floating operation of the shutter is obtained by providing biasing means on one side edge of the shutter with one end of the biasing means anchored to the plate member. The other side edge of the shutter is supported by wire hooks extending through bearing guides in the form of brackets attached to extend outwardly from the plate which anchors the biasing means. By making the wire hooks relatively movable with the shutter at the point of attachment, the shutter is made self aligning when contact is made with the felt and any lateral twisting or shifting of the shutter is not likely to cause binding at the bearing guides to retard action of the shutter. Operation of the shutter is obtained by holding magnets mountable in the plate which supports the shutter to act on magnetic pieces carried by the wire hooks.

Thus, it will be seen that a new and improved oscillographic recorder has been provided in which light shielding is provided in conjunction with a shutter mechanism capable of fast operation. It will be further appreciated that the arrangement makes possible an economical device not dependent on precision parts.

The features of this invention which are believed to be novel are set forth with particularity in the appended claims. The invention itself may be better understood as to organization and construction as well as to further objects and advantages by reference to the following description taken in conjunction with the accompanying drawings in which:

FIGURE 2 is a cross section of an enclosure portion of an oscillographic recorder for the recorder system.

FIGURE 5 is a fragmentary perspective view of a channel member shown mounted on the plate member of FIGURE 3.

FIGURE 6 is a fragmentary end view of the shutter and connections to the operating means with the connection to the hook guide shown in partial cross section.

FIGURE 7 is a partial cross section taken along line 7—7 in FIGURE 3 showing details of construction of the mechanical connection for resetting operation.

Figure 1:
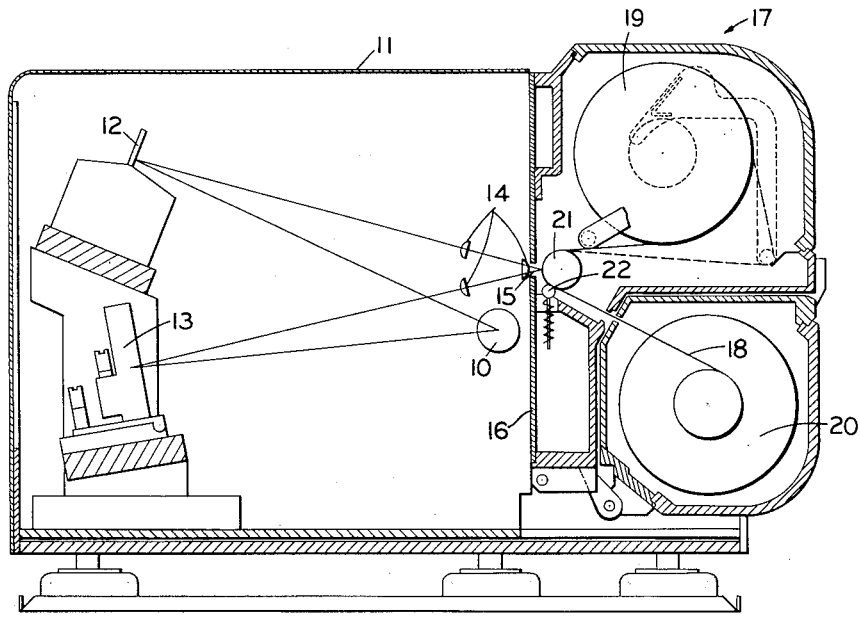
FIGURE 1 is a cross sectional view of an oscillographic recorder incorporating broadly the operating elements in schematic portrayal.

Referring to the figures, FIGURE 1 shows a schematic presentation of an oscillographic recorder having an optical system including a suitably energized continuously radiating light source 10 within housing 11. Light emanating from light source 10 is directed to suitable galvanometers 12 and 13 which direct the beams through optical elements 14 through aperture 15 in plate member 16. Housed in a detachable enclosure or case 17 is a recording system having a photo sensitive strip 18 movable past aperture 15 from supply roll 19 to rewind roll 20 by drive member or roller 21 coacting with retractable idler roller 22. Plate member 16 closes off the recorder system from the housing 11 and in the preferred arrangement is detachably mounted over the end of enclosure 17 for demounting therewith from housing 11.

Further details of the preferred embodiment where the recorder system including photo sensitive strip 18 is housed separately in enclosure 17 can be seen by referring to FIGURE 2. There it will be seen that plate member 16 has an aperture 15 in which is fixed a channel member 23 which from FIGURE 5 can be seen to be an elongated flanged sheet pressed to have a depression in which an aperture is found. The aperture therethrough is formed by milling the end of the channel. While the channel member 23 may be attached in position in the aperture of plate member 16, it is preferably placed therein so as to be securely fixed thereto in a light tight arrangement. The depth of the channel is designed to be great enough so that it extends inwardly through the aperture and beyond to some degree.

Mounted within enclosure 17 is a second plate member 24 having an elongated aperture 25 therein. Plate member 24 is positioned within the enclosure 17 in such a manner that its aperture is in substantial alignment with aperture 15 of plate member 16 and channel member 23. It is notable that in the embodiment shown in FIGURE 2 that the plate member 24 in addition to serving as a light obstructing member also functions as a guide for slack photo sensitive strip 18. In addition, plate member 24 is provided with an aperture 26 through which retractable roller 22 is movable to press strip 18 into frictional engagement with a drive roller 21. Spring means 29 is attached to enclosure 17 to press strip 18 out of engagement with retractable roller 21. Means for actuating the drive roller, such as holding magnets 58, is preferably mounted on plate member 16.

Figure 4:
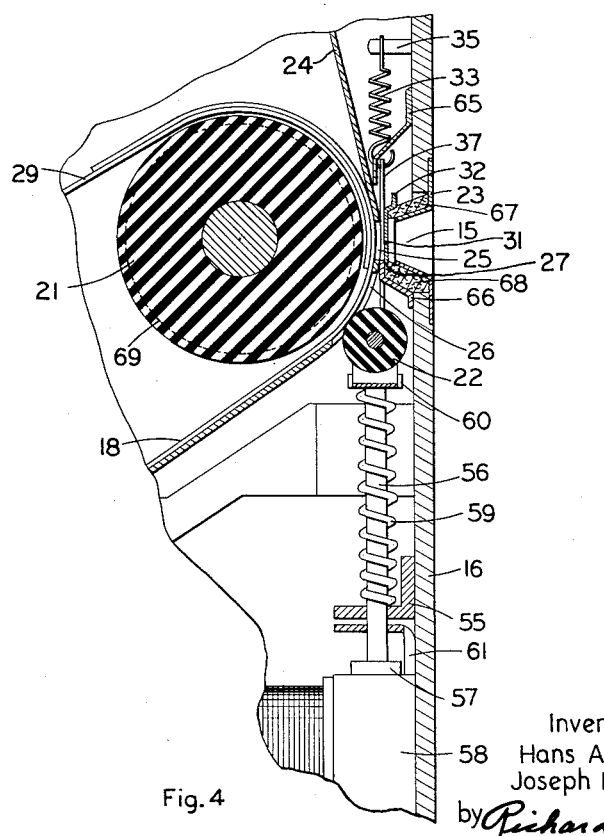
FIGURE 4 is an enlarged cross sectional of a fragment of FIGURE 2 showing additional details of a further embodiment of the shutter arrangement.
Figure 3:
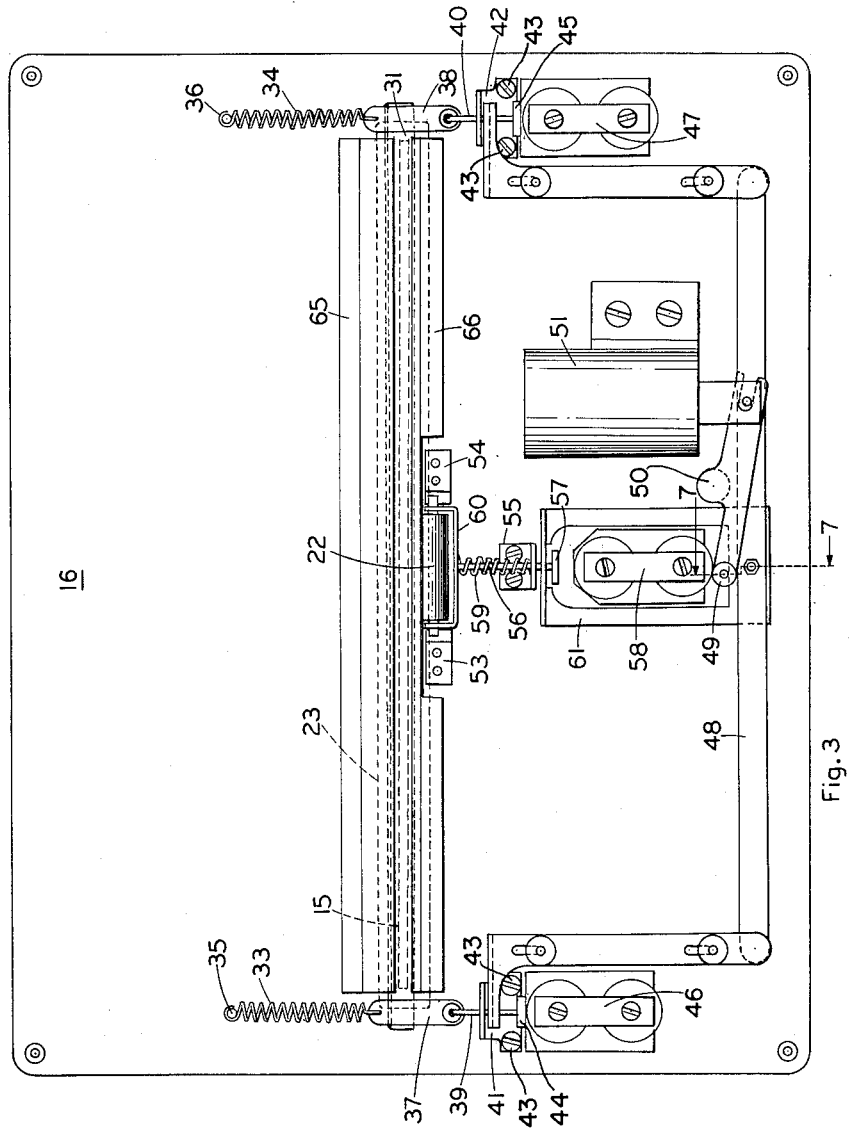
FIGURE 3 is a plan view of the light obstructing member and shutter operating elements mounted thereon.

The obstruction to light penetration into enclosure 17 through plate members 16 and 24 is completed by a shutter comprising an elongated shutter plate 31 preferably formed to have a flange 32 along one edge as best seen in FIGURE 4. It will be observed that the shutter is made to be out of engagement with the elements which cooperate therewith to obstruct light passage and thus may be said to be floating. Floating support as well as translatory movement is provided to shutter plate 31 by springs 33 and 34 anchored to plate member 16 as by supporting pegs 35 and 36 as best seen in FIGURE 3.

In the preferred embodiment, the apertures 15 and 25 are elongated, as well as the shutter plate 31, and may be as long as ten inches. Thus while floating support for the shutter plate 31 may be provided in a variety of ways, it is best provided by cooperation of a number of elements arranged in the preferred manner best seen in FIGURE 3. There it will be seen that the shutter comprising plate 31 is provided at opposite ends with a pair of flat tabs 37 and 38. Attached to tabs 37 and 38 on one end thereof are biasing means in the form of coil springs 33 and 34 only 33 being viewable in FIGURE 2. The springs 33 and 34 act to bias the shutter to one side of aperture 15 by being anchored by suitable pegs 35 and 36 attached in any well known manner to plate 16. The opposite ends of tabs 37 and 38 are supported on the other end by a pair of brackets 41 and 42 suitably mounted on plate 16 by screws 43, the brackets having bearing openings through which may slidably extend wires 39 and 40. The ends of wires 39 and 40 are adapted to support shutter 31 out of engagement with any surrounding apertured elements. Connection to tabs 37 and 38 is made by wires 39 and 40 through a hook and eyelet connection best seen in FIGURE 6, which permits relative turning between the tabs and wires. Fixed to the farthest ends of the wires 39 and 40 are magnetic pieces 44 and 45 which respectively limit the length of travel of the shutter 31 and coact with holding magnets 46 and 47 to oppose the bias of springs 33 and 34 to hold shutter 31 over aperture 15. A U-shaped bracket member 48 adapted to be slidably movable along plate 16 is operatively engageable by roller 49 of pivotable lever 50 actuated by solenoid 51. Also mounted on plate 16 is an idler roller 22 slidably movable thereon by supporting blocks 53 and 54 and bracket member 55 adapted to support an extending rod 56 having a magnetic piece 57 on one end adapted to be attracted by a holding magnet 58 to hold roller 22 in retracted position against the bias of spring 59 adapted to be compressed between bracket 55 and frame 60 of roller 22. A rectangular frame piece 61 is slidable on plate member 16 to retract roller 22 when solenoid 51 is energized and the lost motion connection between bracket 48 and frame 61 is operative. As seen in FIGURE 7 lost motion between bracket 48 and frame 61 is obtained from a member 62 fixedly attached to bracket 48 and having an extension 63 movable in an elongated slot 64 of frame 61.

The entire operating assembly for floatingly supporting shutter 31 is mounted on plate 16 which in time is adapted to cover the end of enclosure 17. Also mounted on plate 16 on opposite sides along the entire length of aperture 15 and extending in spaced apart relation are Z-shaped strips 65 and 66. By referring to FIGURE 4, it can be clearly seen that the Z-shaped strips 65 and 66 are so arranged as to close the top and bottom edges of aperture 15 by extending across the entire separation between plates 16 and 24. In that manner, the strip and channel member effectively form an enclosure, which is open ended, as best seen in FIGURE 3, within which shutter plate 31 is floatingly movable. Further light penetration obstruction is provided by depressionable felt pads 67 and 68 between Z-strips 65 and 66 and along the sloping sides of channel member 23 against which the leading edge 27 and trailing flange 32 of shutter plate 31 are brought to bear. When this occurs, the shutter plate if misaligned slightly will nevertheless be permitted to turn by virtue of the loose connection with wires 39 and 40 and springs 33 and 34. In that respect, shutter plate 31 can be considered self aligning as well as floating.

The operation can be understood from the following description.

Referring to FIGURE 1, the oscillographic recorder of the type embodying our invention operates in accordance with well known principles to translate an electrical condition to variations in the amplitude of a light beam emanating from a constantly radiating light source 10 to galvanometers 12 and 13 through an aperture 15 to recording strip 18. Where the condition to be recorded occurs, the recorder system is energized to initiate the movement of the strip 18 past the aperture by accelerating it to a predetermined rate of travel. This occurs when idler roller 22, as best seen in FIGURES 2 and 4 is released from retracted position to move as a result of the bias of spring 59 to press strip 18 into engagement with rotating drive member 21. During driving of strip 18, spring 29 is caused to be retracted in recess 69 in drive roller 21. The shutter mechanism is operated to move plate 31 away from the aperture 15 at the same time. In the preferred embodiment, as best seen in FIGURES 2, 3, and 4, the movement of idler roller 22 and the shutter mechanism is effectuated simultaneously by de-energization of holding magnets 46, 47, and 58 mountable with idler roller 22 and shutter plate 31 on plate 16. When de-energization of holding magnet 58 occurs, idler roller 22 is free to move in accordance with the bias of spring 59 by sliding at one end on blocks 53 and 54. It is guided in its movement by rod 56 slidably moving in bearing bracket member 55 and has a magnetic piece 57 at one end for attraction to holding magnet 58. When de-energization of holding magnets 46 and 47 occurs, magnet pieces 44 and 45 on the ends of wire rods or hooks 39 and 40 are released. Shutter plate 31 is free to move in accordance with the bias of springs 33 and 34 connected to transverse end tabs 37 and 38 to the open position. Plate 31 is guided in its travel by bearing brackets 41 and 42 in which wire hooks 39 and 40 are movable. By reference to FIGURES 2 and 4, it will be seen that pegs 35 and 36 which anchor one end of springs 33 and 34 to plate member 16 and brackets 41 and 42 which are constructed similar to bracket 55 shown in these views extend outwardly from the plate member 16. In this manner, the shutter plate 31 is maintained floating with relation to the plate member 16 and the only possible friction to retard the movement of shutter plate 31 is at brackets 41 and 42. To avoid binding at these brackets, where shutter plate 31 due to some manufacturing tolerance might tend to shift laterally, the wire hooks 39 and 40 are loosely connected in an eyelet construction shown in FIGURE 6 and support is given by bending the end of wire hooks to engage tabs 37 and 38 underneath.

The resetting of the shutter at the end of a recordation is accomplished by solenoid 51 being energized to actuate movement of slidable frame 61 and bracket 48 which are adapted to be slidably connected to rod 56 and wire hooks 39 and 40. The movement of frame 61 and bracket 48 occurs through the action of roller 49 movable by pivoted lever 50. The amount of movement of the idler roller 22 can be made to be less than that of shutter plate 31 by the lost motion arrangement of FIGURE 7 in which extension 63 moves in slot 64 of frame 61.

In the preferred embodiment the plate 16 with the shutter and idler roller operating mechanism mounted thereon is mounted over the end of enclosure 17. This brings the idler roller in position proximate to drive roller 21 around which strip 18 passes. To provide a light obstruction arrangement which does not impede the speed of the shutter operation, a second plate 24 is interposed between plate 16 and strip 18. Since aperture 15 is in alignment with an aperture 25 in second plate 24 a direct path is provided for the light beam to pass the strip 18 during recordation. When plate 16 and plate 24 are mounted in position, they are spaced apart so as to provide a chamber in which shutter 31 is translatorily movable while being floatingly supported for fast action.

While considerable obstruction to light penetration can be provided when the shutter is in a closed condition by making plate 31 wide enough consistent with desired speed to require light rays from light source 10 to be directed from a straight path in order to reach strip 18, a further reduction of light penetration is obtained if the aperture of the plate 16 has a channel member 23 which tends to restrict light from passing around the side edges of the shutter 31. A still further obstruction is caused by flange 32, particularly if a light trapping arrangement is made to include strips 65 and 66 and felt pads 67 and 68 which are depressionable when the flange and straight side edge comes into contact therewith. By this arrangement light penetration may be reduced to a minimum without sacrificing speed of shutter movement.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What we claim as new and desire to secure by Letters Patent of the United States is:

1. For use in an oscillographic recorder of the type wherein radiations from a continuously energized source are directed against a radiation sensitive recording strip, a shutter mechanism interposed between the source and the recording strip comprising means for selectively obstructing the recording beam including first and second beam obstructing plate members, said plate members having elongated apertures in substantial alignment, a radiation directing elongated channel member extending inwardly from said first plate member toward said second plate member, top and bottom plates extending between said plate members so as to form a radiation trapping enclosure with said channel member, a shutter translatorily movable between said channel member and said second plate member within said enclosure, said shutter being shaped to have a straight side edge and an elongated flange extending generally parallel to one side of said channel member, depressionable pad members between said top and bottom plates and the sides of and along the entire length of said channel member, and support means attached to said first plate member and pivotably connected to said shutter member to maintain said shutter member between said plate members and bringing said elongated flange and the straight side edge in radiation sealing contact with said depressionable pads.

2. For use in an oscillographic recorder of the type wherein radiations from a continuously energized source are directed against a radiation sensitive recording strip, a shutter mechanism interposed between the source and the recording strip comprising means for selectively obstructing the recording beam including first and second radiation obstructing plate members, said plate members having elongated apertures in substantial alignment, a radiation directing channel member extending inwardly from said first plate member toward said second plate member, a first and second interior plate member extending between said plate members in a direction substantially parallel with the longitudinal edges of said apertures with said first and second interior plates each being associated with the corresponding edges of said apertures so as to form a radiation trapping enclosure with said channel member, a shutter translatorily movable between said channel member and said second plate member within said enclosure, said shutter being shaped to have a straight side edge and a flange extending generally parallel to one side of said channel member, depressionable pad members between said interior plates and the sides of and along the entire length of said channel member, means attached to said first plate member for floatingly supporting and translatorily moving said shutter member between said plate members, said last mentioned means comprising at least two bearing bracket means, guiding wire connecting means adapted to be slidably operated in said bracket means, said guiding wire connecting means being loosely attached to said shutter member whereby said shutter member is self-aligning when said flange and the straight edge are in abutting contact with said pads, said floating support means disposed so as to prevent frictional engagement between said shutter and said first and second radiation obstructing plate members during translatory movement.

3. The shutter mechanism as defined in claim 2 wherein said shutter supporting means comprises a spring bias member attached to each of the end regions of said elongated shutter, the bias of said spring members being opposed by the action of holding magnets which include a magnetic member attached to each of the end regions of said elongated shutter, said holding magnets being adapted to be selectively actuated so as to enable the opening of the shutter upon the occurrence of a signal to be recorded.

4. The shutter mechanism as defined in claim 3 wherein said springs are supported by members rigidly attached to said first plate member and said magnetic pieces are attached to the end regions of said elongated shutter through a hook and eyelet connection which permits relative turning between the magnetc members and said elongated shutter.

References Cited in the file of this patent

UNITED STATES PATENTS

| | | |
|---|---|---|
| Re. 18,956 | Dyche | Sept. 19, 1933 |
| 451,027 | Connon | Apr. 28, 1891 |
| 1,149,157 | Unbehaun | Aug. 3, 1915 |
| 2,169,548 | Zapp | Aug. 15, 1939 |
| 2,201,473 | Carlson | May 21, 1940 |
| 2,531,639 | Neyhart | Nov. 28, 1950 |
| 2,551,597 | Hall | May 8, 1951 |
| 2,822,721 | Parker et al. | Feb. 11, 1958 |

FOREIGN PATENTS

| | | |
|---|---|---|
| 312,877 | Great Britain | June 6, 1929 |